United States Patent Office 2,739,149
Patented Mar. 20, 1956

2,739,149
SYMMETRICAL CARBOCYANINE DYES

Earl J. Van Lare, Rochester, N. Y., assignor to Eastman Kodak Company, Rochester, N. Y., a corporation of New Jersey No Drawing. Application February 27, 1953,
Serial No. 339,459

6 Claims. (Cl. 260—240.65)

This invention relates to symmetrical carbocyanine dyes containing a benzimidazole nucleus. More particularly, this invention relates to symmetrical carbocyanine dyes containing a benzimidazole nucleus having substituted thereon at least one chlorine atom.

Symmetrical imidazolocarbocyanine dyes have been previously prepared. See Ogata—"Proceedings of the Imperial Academy" (Tokyo), volume 9 (1933), page 602.

I have now found a new class of symmetrical carbocyanine dyes containing a benzimidazole nucleus having substituted thereon at least one chlorine atom. The new dyes of my invention have been found to be particularly useful in altering the sensitivity of photographic silver halide emulsions, particularly in the blue-green region of the spectrum. The sensitizing bands of the new dyes of my invention are unusually sharp, hence they can be used expeditiously in sensitizing photographic silver halide emulsions where little or no sensitivity in the red region of the spectrum is desired.

The new symmetrical carbocyanine dyes of my invention can advantageously be represented by the following general formula:

I
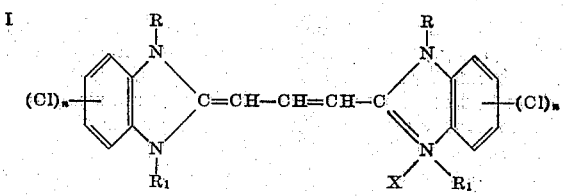

wherein R is an alkyl group, such as methyl, ethyl, n-propyl, n-butyl, allyl (vinylmethyl), carbethoxymethyl, etc., or an aryl group, such as phenyl, o-, m- or p-tolyl, etc. (e. g. a mononuclear aromatic group of the benzene series), $R_1$ represents an alkyl group, such as methyl, ethyl, n-propyl, n-butyl, allyl (vinylmethyl), carbethoxymethyl, etc., X represents an acid radical, such as chloride, bromide, iodide, p-toluenesulfonate, benzenesulfonate, ethylsulfate, methylsulfate, perchlorate, thiocyanate, etc., and $n$ represents a positive integer of from 1 to 2. The dyes of Formula I wherein R and $R_1$ each represents an alkyl group containing from 1 to 4 carbon atoms have been found to be particularly useful.

According to my invention, the dyes represented by Formula I above can advantageously be prepared by condensing together a quaternary salt selected from those represented by the following general formula:

II
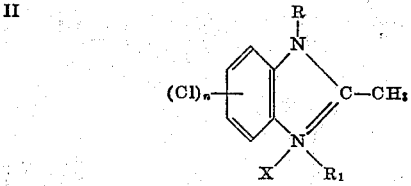

wherein R, $R_1$, X and $n$ each have the values given above, with diethoxymethyl acetate or chloral alcoholate. Instead of using diethoxymethyl acetate, other dialkoxymethyl acetates, e. g. dimethoxymethyl acetate, etc., can be used. The condensation of the quaternary salts of Formula II with chloral alcoholate are advantageously carried out in the presence of an inert diluent, such as the alcohol from which the alcoholate is obtained. For example, inert diluents such as ethanol, n-propanol, n-butanol, etc., can be employed. The condensations are advantageously carried out in the presence of a strong base, such as an alkali metal alcoholate, e. g. sodium ethylate, potassium ethylate, etc. Heat accelerates the condensations, although temperatures varying from room temperature to the reflux temperature of the reaction mixture can be employed.

The condensation of the quaternary salts of Formula II with a dialkoxymethyl acetate is advantageously carried out in the presence of a basic condensing agent, such as pyridine, quinoline, triethylamine, N,N-diethylaniline, N-methylpiperidine, etc. Heat accelerates the condensation, although temperatures varying from room temperature to the reflux temperature of the reaction mixture can be employed.

The following examples will serve to illustrate more fully the manner whereby I prepare the new carbocyanine dyes of my invention.

*Example 1.—5,5'-dichloro-1,1',3,3'-tetraethylbenzimidazolocarbocyanine iodide*

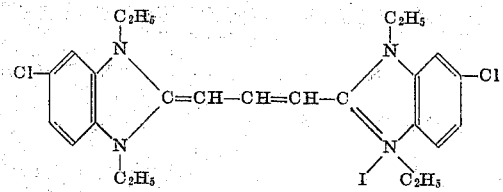

*Method A.*—5-chloro-1,3-diethyl-2-methylbenzimidazolium iodide (3.5 g., 2 mols.), and chloral alcoholate (1 g., 1 mol.) were added to a solution of sodium (0.6 g., 3 mols.) in 60 ml. of ethanol and the mixture refluxed for 30 minutes. The hot solution was filtered and the solid washed well with water. A crude yield of 1.8 g. 62% of dye was obtained. After recrystallization from ethyl alcohol, the dye was obtained in a 29% yield as orange crystals, M. P. 271–272° C. dec.

*Method B.*—5-chloro-1,3-diethyl-2-methylbenzimidazolium iodide (3.5 g., 2 mols.), diethoxymethyl acetate (1.6 g., 1 mol.+100% excess) and 25 ml. of pyridine were refluxed together for 2 hours. The solution was chilled and some unchanged quaternary salt filtered off. The crude dye was precipitated from the filtrate by addition of ether. After filtering and washing well with water, the crude dye was recrystallized from ethyl alcohol. The purified dye was obtained in a 4% yield as red plates.

*Example 2.—5,5',6,6'-tetrachloro-1,1',3,3'-tetraethylbenzimidazolocarbocyanine iodide*

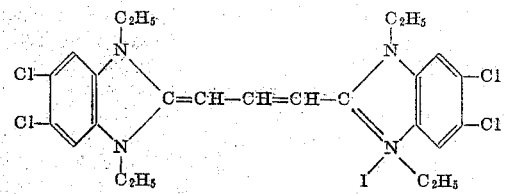

*Method A.*—5,6-dichloro-1,3-diethyl-2-methylbenzimidazolium iodide (7.7 g., 2 mols.) and chloral alcoholate (2 g., 1 mol.) were added to a solution of sodium (1.4 g., 3 mols.) in 120 ml. of ethyl alcohol and the mixture refluxed for 30 minutes. The reaction mixture was chilled, filtered, and the solid washed well with water and acetone.

After recrystallization from methyl alcohol, the pure dye was obtained in a 32% yield as lustrous crystals, M. P. 275–278° C. dec.

*Method B.*—5,6-dichloro-1,3-diethyl-2-methylbenzimidazolium iodide (7.7 g., 2 mols.), diethoxymethyl acetate (3.2 g., 1 mol.+100% excess) and 70 ml. of pyridine were refluxed together for 2½ hours. The solution was cooled and the crude dye filtered off and washed well with water and acetone. After recrystallization from methyl alcohol, the pure dye was obtained in an 18% yield.

*Example 3.—5,5'-dichloro-1,1',3,3'-tetramethylbenzimidazolocarbocyanine iodide*

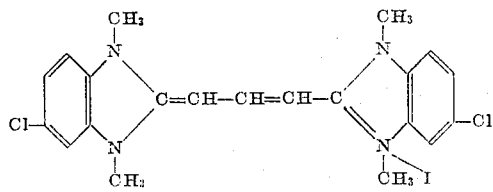

5 - chloro - 1,2,3-trimethylbenzimidazolium iodide (5.4 g., 2 mols.) and choral alcoholate (1.6 g., 1 mol.) were added to a solution of sodium (2.3 g., 6 mols.) in 100 ml. of ethyl alcohol, and the mixture refluxed 45 minutes. The crude dye was filtered from the hot reaction mixture and washed well with water. After recrystallization from pyridine, the dye was obtained in a 4% yield as dark reddish crystals, M. P. 288–289° C. dec.

*Example 4.—1,1',3,3'-tetrallyl-5,5'-dichlorobenzimidazolocarbocyanine iodide*

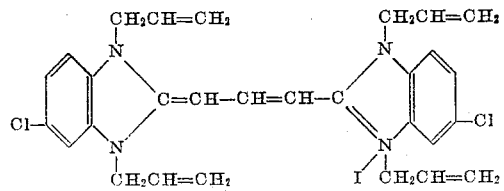

1,3 - diallyl - 5 - chloro - 2 - methylbenzimidazolium iodide (7.5 g., 2 mols.), diethoxymethyl acetate (3.2 g., 1 mol.+100% excess) and 30 ml. of pyridine were refluxed together for 4 hours. After cooling, the dye was precipitated with water, filtered off and washed well with water. After recrystallization from methyl alcohol, the pure dye was obtained in a 20% yield as dark red crystals with a green reflex, M. P. 234–236° C. dec.

*Example 5.—5,5'-dichloro-3,3'-diethyl-1,1'-diphenyl-benzimidazolocarbocyanine iodide*

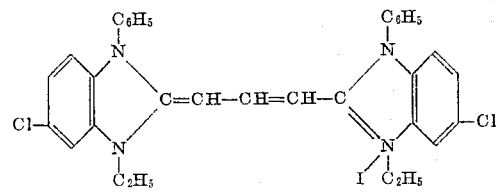

5 - chloro - 3 - ethyl - 2 - methyl - 1 - phenyl benzimidazolium p-toluene sulfonate (4.4 g., 2 mols.), diethoxymethyl acetate (1.6 g., 1 mol.+100% excess) and 10 ml. of pyridine were refluxed together for 3 hours. After cooling, the reaction mixture was treated with 100 ml. of ether. The supernatant liquid was decanted and the oil was washed again with ether and then dissolved in a small amount of ethyl alcohol. The dye was converted to the iodide by the addition of a hot solution of 3 g. of sodium iodide in water. After cooling, the dye was filtered off and washed with water. After recrystallization from ethyl alcohol, the pure dye was obtained in a 15% yield as dark red crystals with a green reflex, M. P. 280–281° C. dec.

*Anal.*—Calculated for $C_{33}H_{29}Cl_2IN_4$: C, 58.3; H, 4.3. Found: C, 58.5; H, 4.7.

*Example 6.—5,5',6,6'-tetrachloro-3,3'-diethyl-1,1'-diphenylbenzimidazolocarbocyanine bromide*

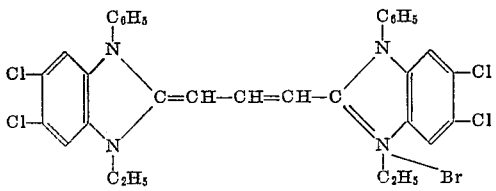

5,6 - dichloro - 3 - ethyl - 2 - methyl - 1 - phenylbenzimidazolium p-toluenesulfonate (4.8 g., 2 mols.), diethoxymethyl acetate (1.6 g., 1 mol.+100% excess) and 15 ml. of pyridine were refluxed together for 2 hours. After cooling, the reaction mixture was treated with 150 ml. of ether. The supernatant liquid was decanted off and the oil washed again with ether. The oil was dissolved in a small amount of ethyl alcohol and converted to the bromide by the addition of a hot solution of 3 g. of sodium bromide in water. After cooling, the dye was filtered off and washed well with water. After recrystallization from ethyl alcohol, the dye was obtained in a 23% yield as dark red crystals with a green reflex, M. P. 272–273° C. dec.

The following examples will serve to illustrate the method of preparing certain intermediates employed in the above examples.

*Example 7.—5,6-dichloro-2-methyl-1-phenyl benzimidazole*

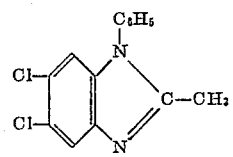

2,4,5-trichloronitrobenzene (160 g., 1 mol.) and aniline (130 g.) were heated on a steam bath for 65 hours. Three hundred (300) ml. of water and 100 ml. of 40% sodium hydroxide were added and the mixture steam distilled to remove excess aniline. When no more oil steam distilled, the residue was cooled, and the supernatant water decanted, as much as possible. The residue was dissolved in 1500 ml. of glacial acetic acid, to which 250 ml. of acetic anhydride were added. The solution was heated to refluxing and zinc (275 g., 6 mols.) was added in small quantities with stirring. A vigorous reaction occurred with each addition. After all of the zinc was added, the mixture was heated and stirred for an additional hour. The zinc acetate was filtered off and washed with acetic acid. The filtrate was concentrated to a small volume and poured into 1 liter of water. It was made strongly alkaline with sodium hydroxide. The suspension was extracted with 4 liter of benzene, the benzene solution concentrated to 700 ml. and cooled. The solid was filtered off and washed with benzene. The benzene solution was concentrated to dryness and the residue distilled. B. P. 160–210° C./0.5 mm. A 17% yield of waxy solid was obtained. A small sample was purified by recrystallization from ethyl alcohol, M. P. 107–108° C.

*Example 8.—5,6-dichloro-3-ethyl-2-methyl-1-phenylbenzimidazolium p-toluenesulfonate*

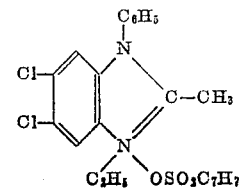

5,6-dichloro-2-methyl-1-phenylbenzimidazole (32 g., 1 mol.) and ethyl p-toluenesulfonate (32 g., 1 mol.+40% excess) were heated on a steam bath for 3 hours. The melt was cooled and stirred with 300 ml. of acetone. After cooling, the solid was filtered off and washed with acetone. A 44% yield of white crystals was obtained, M. P. 229–232° S. dec.

*Example 9.—5-chloro-2-methyl-1-phenylbenzimidazole*

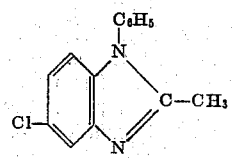

2,5-dichloronitrobenzene (233 g., 1 mol.) and aniline (226 g., 2 mols.) were heated to 150° C. for 2 hours. Finely pulverized sodium carbonate (64 g., 1 mol.) was added and the whole gently refluxed for 4 hours. The reaction mixture was cooled and the excess aniline steam distilled out. The residue was cooled and the supernatant water decanted off. The residue was suspended in 690 ml. of concentrated hydrochloric acid and 600 ml. of water. Mossy tin (346 g., 3½ mols.) was added to the hot, stirred suspension. A good bit of heat was developed and the mixture boiled. After all the tin was added, the mixture was heated and stirred 4 hours on a steam bath. After cooling, the mixture was made strongly alkaline with sodium hydroxide, and extracted with ether. The ether was removed and the residue mixed with 400 ml. of acetic anhydride. The temperature slowly rose and finally, the acetic acid boiled. The acetic acid and excess acetic anhydride were slowly distilled off. The residue was poured into water and made alkaline with sodium hydroxide. It was extracted with ether and distilled. B. P. 150–160° C./0.5 mm. The distillate was crystallized from ligroin (B. P. 90–120°) to give 42.7 g. to 21% of product, M. P. 115–117° C.

*Anal.*—Calculated for $C_{14}H_{11}ClN_2$: C, 69.3; H, 4.6. Found: C, 69.7; H, 4.9.

*Example 10. — 5 - chloro - 3 - ethyl - 2 - methyl - γ - phenylbenzimidazolium p-toluenesulfonate*

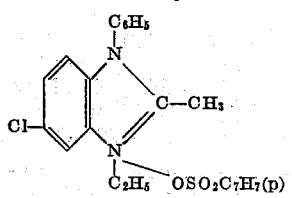

5-chloro-2-methyl-1-phenylbenzimidazole (12.1 g., 1 mol.) and ethyl p-toluenesulfonate (10 g., 1 mol.) were heated together for 3 hours at 140° C. It was then refluxed with acetone for 15 minutes. The cake was ground in a mortar with acetone, filtered and washed with acetone. A yield of 20.7 g. 93% of white crystals was obtained.

*Example 11.—4-chloro-N-ethyl-2-nitroaniline*

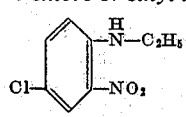

2,5-dichloronitrobenzene (107 g., 1 mol.) was added slowly with stirring to 70% ethylamine (200 ml., 4 mols.). After all of the material was added, the mixture was heated in a water bath at 40–50° C. using a coil condenser for 12 hours. The material was chilled, filtered, and washed with water. It was stirred with a small amount of methyl alcohol and filtered. A sample was crystallized from methyl alcohol and found to have a M. P. of 89–91° C. A 96% yield was obtained.

*Example 12.—5-chloro-1-ethyl-2-methylbenzimidazole*

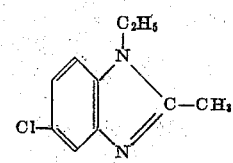

Mossy tin (363 g., 3 mols.) was added slowly to a hot (90–100° C.) stirred suspension of 4-chloro-N-ethyl-2-nitroaniline (221 g., 1 mol.) in 920 ml. of concentrated hydrochloric acid and 1200 ml. of water. A vigorous reaction occurred and after the addition, the mixture was refluxed with stirring for 2 hours. The mixture was cooled and made strongly alkaline with 40% sodium hydroxide. The cooled suspension was filtered, and the solid and liquid extracted separately with benzene. The benzene extracts were combined, the benzene removed on a steam bath under reduced pressure, and the residue of 4-chloro-N-ethyl-o-phenylene diamine used crude.

One-half of the crude o-phenylene diamine (theory of 94 g.) and 200 ml. of acetic anhydride were slowly mixed. A good bit of heat was developed and the mixture boiled. The acetic acid and excess acetic anhydride were slowly distilled off. The residue was poured into 2 liters of water and made alkaline with sodium hydroxide. The product was extracted with ether, the ether solution dried with magnesium sulfate, and then the ether removed on a steam bath. The residue was distilled. A 90% yield was obtained, B. P. 165–170° C./4 mm. Crystallization from ligroin (B. P. 90–120°C.) yielded a product M. P. 84–86° C.

*Example 13. — 5 - chloro - 1,3 - diethyl - 2 - methylbenzimidazolium iodide*

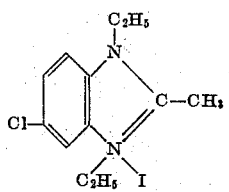

5-chloro-1-ethyl-2-methylbenzimidazole (20 g., 1 mol.) and ethyl iodide (23.4 g., 1 mol.+25% excess) were heated together on a steam bath for 2 hours. The solid cake was crushed in a mortar and washed with ether. It was filtered off and washed with acetone. A 78% yield of colorless crystals was obtained, M. P. 250–251° C. dec. Recrystallization from methyl alcohol did not change the M. P.

*Example 14.—4,5-dichloro-N-ethyl-2-nitroaniline*

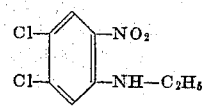

2,4,5-trichloronitrobenzene (155 g., 1 mol.) was added with shaking to 300 ml. of 70% ethylamine (4.4 mols.). After standing for ½ hour at room temperature under a coil condenser, the suspension became quite warm and the reaction was cooled in ice water. After cooling, it was allowed to come to room temperature and stand for ¾ hour, when it became necessary to cool again. It was then stood at room temperature overnight. The solid was filtered off and washed with water. A nearly quantitative yield of orange crystals was obtained, M. P. 95–103°C.

*Example 15. — 5,6 - dichloro - 1 - ethyl - 2 - methylbenzimidazole*

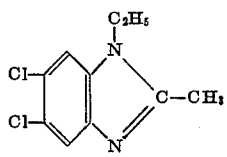

Mossy tin (288 g., 3½ mols.) was added slowly (with stirring) to a hot (90–100° C.) suspension of 4,5-dichloro-N-ethyl-2-nitroaniline (161 g., 1 mol.) in 890 ml. concentrated hydrochloric acid and 750 ml. water. After all the tin was added, the mixture was refluxed for 2 hours. The reaction mixture was cooled and made strongly alkaline with 40% sodium hydroxide. The cooled suspension was filtered, and the solid and liquid extracted separately with benzene. The benzene extracts were combined and the benzene removed under reduced pressure. To the residue of 5,6-dichloro-N-ethyl-o-phenylene diamine were added 200 ml. of acetic anhydride portion-wise. The solution was allowed to stand overnight and then the acetic acid and excess acetic anhydride distilled off. The residue was poured into 2 liters of water and made strongly alkaline with sodium hydroxide. The product was extracted with ether, the ether solution dried over magnesium sulfate, and the ether removed on a steam bath. The residue was distilled, B. P. 175–200° C./2 min. The distillate was melted and poured into ligroin. After filtering, the benzimidazole was obtained in a 55% yield as colorless crystals, M. P. 80–85° C.

*Example 16. — 5,6 - dichloro - 1,3 - diethyl - 2 - methylbenzimidazolium iodide*

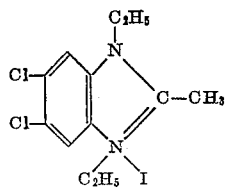

5,6-dichloro-1-ethyl-2-methylbenzimidazole (22.9 g., 1 mol.) and ethyl iodide (23.4 g., 1 mol.+50% excess) were refluxed together for 4 hours. The solid cake was ground in a mortar with acetone, filtered and washed well with acetone. A 78% yield of colorless crystals was obtained.

*Example 17.—5-chloro-2-methylbenzimidazole*

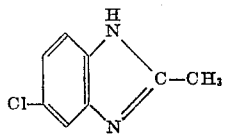

Mossy tin (400 g., 3 mols.+10% excess) was added slowly with stirring to the hot (90–100° C.) suspension of 4-chloro-2-nitroaniline (172.5 g., 1 mol.) in 830 ml. concentrated hydrochloric acid and 1100 ml. water. After all the tin had been added, the mixture was refluxed 3 hours, then cooled and made strongly alkaline with 40% sodium hydroxide. The o-phenylene diamine was extracted with ether, the ether removed on a steam bath and the residue refluxed 4 hours with 500 ml. of acetic anhydride. The reaction mixture was poured into ice and water and made alkaline with sodium hydroxide. The solid was filtered off, and crystallized from methyl alcohol. The solid was placed in a flask and heated very hot whereupon acetic acid distilled over. After ½ hour, the residue was crystallized from ethyl alcohol. An 18% yield of colorless crystals was obtained, M. P. 215–218° C.

*Anal.*—Calculated for $C_8H_7ClN_2$: C, 57.7; H, 4.2. Found: C, 57.4; H, 3.8.

*Example 18. — 5 - chloro - 1,2,3 - trimethylbenzimidazolium iodide*

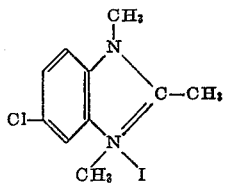

5-chloro-2-methylbenzimidazole (28 g., 1 mol.) and methyl p-toluenesulfonate (32 g., 1 mol.) were heated overnight at 170–180° C. The product was dissolved in 60 ml. of water and an aqueous solution of 30 g. of sodium iodide added. The solution was cooled, the product filtered off and washed with water. A 46% yield of colorless crystals was obtained.

*Example 19.—N-allyl-4-chloro-2-nitroaniline*

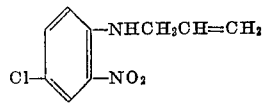

2,5-dichloronitrobenzene (96 g., 1 mol.) was added in small portions to allylamine (57 g., 2 mols.). The reaction mixture was heated overnight on a steam bath, and then cooled. The solid filtered off and washed with water. After crystallization from ethyl alcohol, a 76% yield of orange crystals was obtained, M. P. 58–60° C.

*Example 20.—1-allyl-5-chloro-2-methylbenzimidazole*

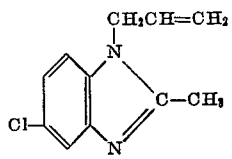

Zinc dust (148 g., 6 mols.) was added slowly to a hot stirred solution of N-allyl-4-chloro-2-nitroaniline (80.7 g., 1 mol.) in 800 ml. of acetic acid and 100 ml. acetic anhydride. After all the zinc was added, the mixture was refluxed with stirring for 2 hours. The mixture was filtered hot and the solid washed with hot acetic acid. The filtrate was concentrated to a small volume and poured into 1 liter of water. The solution was made strongly alkaline with sodium hydroxide, and extracted with ether. The ether was removed on a steam bath and the residue distilled. A 55% yield of waxy solid was obtained, B. P. 190–195° C./12 mm. A sample was recrystallized from ligroin (90–120° C.), M. P. 93–94° C.

*Example 21. — 1,3 - diallyl - 5 - chloro - 2 - methylbenzimidazolium iodide*

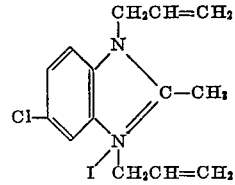

1-allyl-5-chloro-2-methylbenzimidazole (41.3 g., 1 mol.) and allyl iodide (42 g., 1 mol.+25% excess) were heated together on a steam bath for 4 hours. The product was ground in a mortar with acetone, filtered and washed with acetone. A 75% yield of colorless crystals was obtained.

In addition to the diethoxymethyl acetate illustrated above other dialkoxymethyl acetates which can be used in practicing my invention can advantageously be represented by the following general formula:

$CH_3COOCH(OR_2)_2$ wherein $R_2$ represents an alkyl group. Such esters have been previously described in Dent and Brooker U. S. Patent 2,537,880, issued January 9, 1951.

All of the dyes of my invention are particularly useful in manufacturing photographic, silver halide emulsions, serving to alter the sensitivity thereof. Sensitization by means of my new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing my new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Methanol has proven satisfactory as a solvent for the majority of my new dyes.

The concentration of my new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of my new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of my new dyes, 10 to 20 mgs. of dye per liter of emulsion suffices to produce the maximum sensitizing effect with the ordinary gelatino-silver bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of my invention comprise the customarily employed gelatino-silver-chloride, gelatino-silver-chlorobromide, gelatino-silver-bromide, and gelatino-silver-bromiodide developing-out emulsions.

Photographic silver halide emulsions, such as those listed above, containing the sensitizing dyes of my invention can also contain such addenda as chemical sensitizers, e. g. sulfur sensitizers (e. g. allyl thiocarbamide, thiourea, allylisothiocyanate, cystine, etc.), various gold compounds (e. g. potassium chloroaurate, auric trichloride, etc.) (see U. S. Patent 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—"The Theory of the Photographic Process," Macmillan Pub., page 460), or mixtures thereof; hardeners, such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application 771,380, filed August 29, 1947, now U. S. Patent 2,640,776, issued June 2, 1953, etc.; or mixtures of such addenda. Dispersing agents for color couplers, such as those set forth in U. S. Patents 2,322,027 and 2,304,940, can also be employed in the above-described emulsions.

What I claim as my invention and desire secured by Letters Patent of the United States is:

1. A symmetrical carbocyanine dye selected from the group consisting of 5,5'-dichloro-1,1',3,3'-tetraethylbenzimidazolocarbocyanine iodide; 5,5',6,6'-tetrachloro-1,1',3,3'-tetraethylbenzimidazolocarbocyanine iodide; 5,5'-dichloro - 1,1',3,3' - tetramethylbenzimidazolocarbocyanine iodide; 1,1',3,3'-tetrallyl-5,5'-dichlorobenzimidazolocarbocyanine iodide; and 5,5'-dichloro-3,3'-diethyl-1,1'-diphenylbenzimidazolocarbocyanine iodide.

2. The symmetrical carbocyanine dye having the following formula:

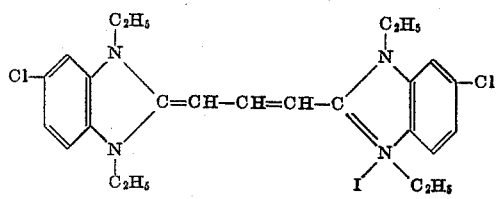

3. The symmetrical carbocyanine dye having the following formula:

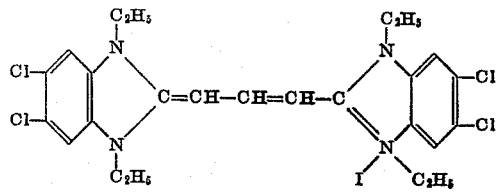

4. The symmetrical carbocyanine dye having the following formula:

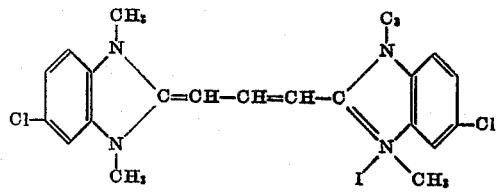

5. The symmetrical carbocyanine dye having the following formula:

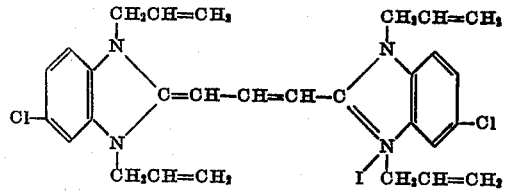

6. The symmetrical carbocyanine dye having the following formula:

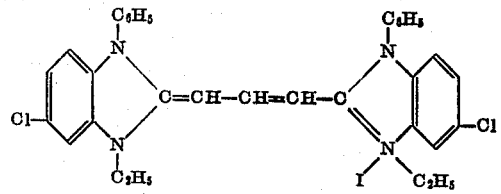

References Cited in the file of this patent

UNITED STATES PATENTS

| | | |
|---|---|---|
| 2,354,524 | Kumetal | July 25, 1944 |
| 2,537,880 | Dent | Jan. 9, 1951 |